Patented Apr. 24, 1945

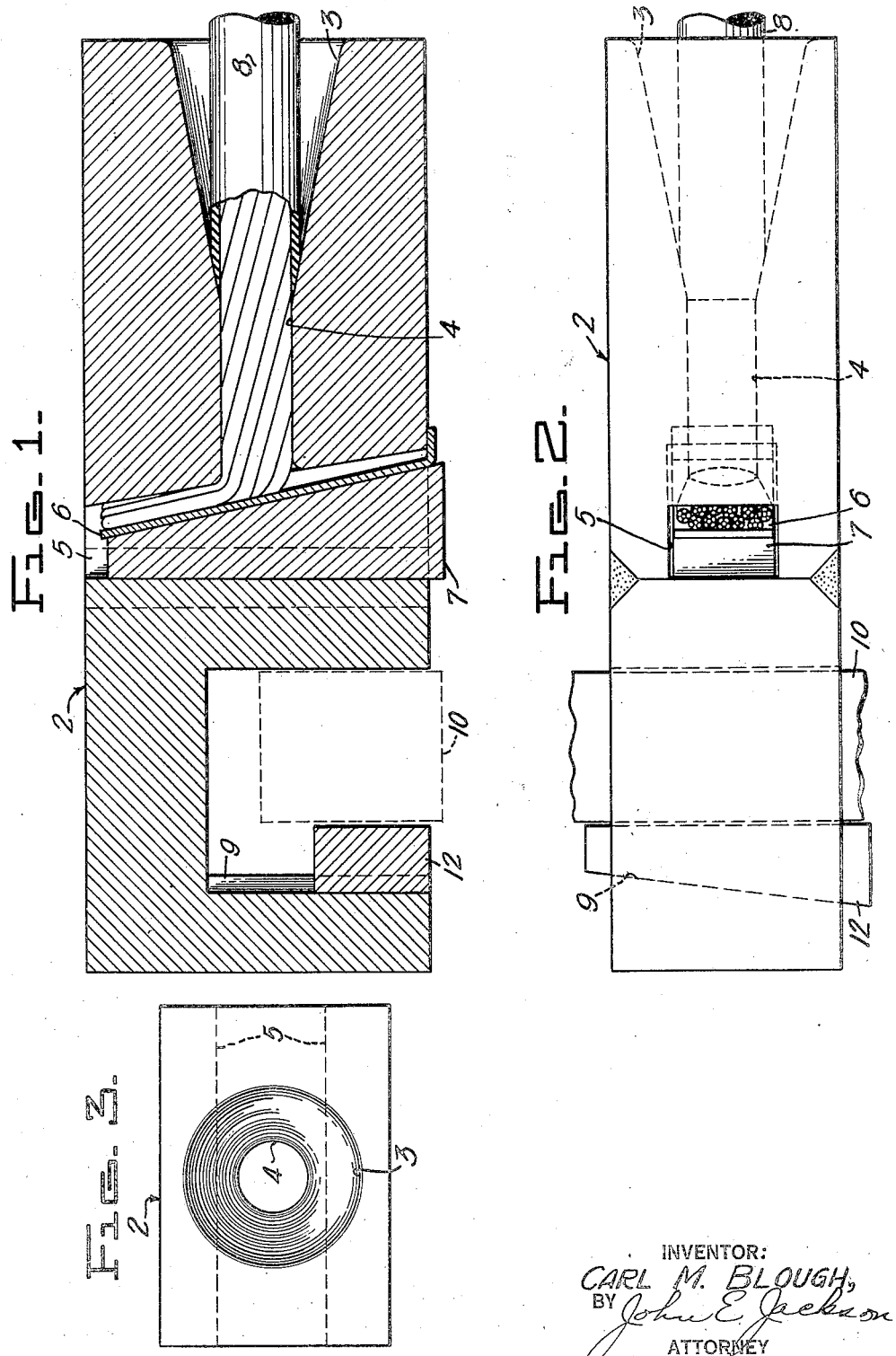

2,374,324

UNITED STATES PATENT OFFICE 2,374,324

GROUND CABLE CLAMP FOR ELECTRIC WELDING MACHINES

Carl M. Blough, Johnstown, Pa., assignor to Carnegie-Illinois Steel Corporation, a corporation of New Jersey Application March 13, 1943, Serial No. 479,094

5 Claims. (Cl. 24—136)

This invention relates to a cable clamp for clamping the ground cable of an electric welding machine. In the common type of clamp now in use, the cable is placed in a slot having a bolt extending therethrough, a bar with a hole for the bolt is placed over the cable and the nut for the bolt is tightened to clamp the cable in position. These clamps are usually handled by the cable as the clamp itself becomes too hot to handle by hand. Most of the work can be done by laying the clamp on the work. In handling the clamp it is often laid or dropped in such a manner that the cable is bent sharply where it is attached to the clamp. In many instances the bare copper is in contact with the work or ground and becomes hot enough to burn off the wire, thus ruining the insulation as well as the wire. The result is that the cable has to be changed at least once or twice a month with a resultant loss in length of the cable. The clamping bolt becomes welded to its nut and has to be cut off. If it is necessary to attach the clamp to the workpiece, it is done by means of a screw. This screw is splashed with hot metal which welds itself to the screw threads and locks the screws in place. In tossing the clamp around the screw may become bent so that it will not turn, thus ruining the entire clamp.

It is an object of this invention to provide an improved cable clamp which eliminates a large part of the damage to the cable.

Another object is to provide a clamp which does not require screws or bolts for clamping.

These and other objects will be more apparent after referring to the following specification and attached claims, in which:

Figure 1 is a cross-sectional elevation of the clamp;

Figure 2 is a plan view; and

Figure 3 is an end view thereof.

Referring more particularly to the drawing, the reference numeral 2 refers to the block or body of the clamp which preferably has four flat sides. The body has a conical bore 3 at one end thereof. This bore terminates in a uniform bore 4 having approximately the same diameter as the body of the cable. Intersecting the bore 4 is a tapered opening 5 for receiving a wear plate 6 and a wedge 7.

To fasten the cable to the clamp the insulation 8 is removed from the end thereof. The bared cable is inserted into the bore 3 with the end thereof extending into the opening 5. The wear plate 6 is inserted into the opening adjacent the end of the cable which is bent upwardly in the manner shown in Figure 1. The wedge 7 is then inserted into the opening 5 and forces the wear plate 6 against the cable, wedging it against the side of the opening 5. It will be seen that when the cable clamp is picked up by means of the cable, there will be no sharp bends therein due to the conical bore 3. Since the insulation remains on the cable in the bore 3, there are no bare wires to become burned by contact with the ground or workpiece. The cable extends from one end of the clamp and will not become bent under the clamp when the clamp is resting on its side on the work, thus enabling the flat surfaces of the clamp to give good contact with the work. When it is desired to remove the cable from the clamp, the wedge 7 is knocked out and the wear plate 6 removed.

For clamping the cable clamp to the workpiece there is a tapered slot 9 in one side of the block. The workpiece 10 is inserted into this tapered opening and the wedge 12 forced into the opening, thus clamping the workpiece against the side of the opening.

To facilitate manufacture of the body of the block it may be made in two parts. The one part consists of that portion to the left of the opening 5, as viewed in Figure 1, and the other part including the opening 5 and the portion to the right thereof. Welding bevels are provided on the two parts and after machining the parts are welded together.

While one embodiment of the invention has been shown and described, it will be apparent that other modifications may be made without departing from the scope of the attached claims.

I claim:

1. A ground cable clamp for electric welding machines comprising a block, said block having a frusto-conical opening in one end thereof for receiving the cable and an intersecting tapered opening therethrough for receiving the end of said cable extending through said bore, and a wedge in said tapered opening for clamping the end of said cable against a wall of said opening.

2. A ground cable clamp for electric welding machines comprising a block, said block having a frusto-conical opening in one end thereof for receiving the cable and an intersecting opening therethrough for receiving the end of said cable extending through said bore, a wedge in said intersecting opening for clamping the end of said cable, said block having a slot in one side thereof for receiving a workpiece and a wedge in said slot for fastening the clamp to the workpiece.

3. A ground cable clamp for electric welding machines comprising a flat-sided block, said block having a frusto-conical opening in one end thereof for receiving the cable and an intersecting tapered opening therein for receiving the end of said cable extending through said bore, a wear plate in said opening adapted to contact said cable, and a wedge in said tapered opening for clamping the end of said cable between said wear plate and a wall of said opening.

4. A ground cable clamp for electric welding machines comprising a block having four flat sides, said block having a frusto-conical opening in one end thereof for receiving the cable, said block having a tapered opening therein extending through the block from one side thereof and intersecting said first named opening, said last named opening being adapted to receive the end of said cable, a wear plate in said tapered opening adapted to contact said cable, and a wedge in said tapered opening for wedging the cable between the wear plate and said tapered opening.

5. A ground cable clamp for electric welding machines comprising a block having four flat sides, said block having a frusto-conical opening in one end thereof for receiving the cable, said block having a tapered opening therein extending through the block from one side thereof and intersecting said first named opening, said last named opening being adapted to receive the end of said cable, a wear plate in said tapered opening adapted to contact said cable, a wedge in said tapered opening for wedging the cable between the wear plate and said tapered opening, said block having a slot in one side thereof for receiving a workpiece, and a wedge in said slot for fastening the clamp to the work.

CARL M. BLOUGH.